Aug. 6, 1929.   H. D. GUMPPER   1,723,851
ELECTRIC POWER GENERATING UNIT
Filed Oct. 22, 1928   5 Sheets-Sheet 4
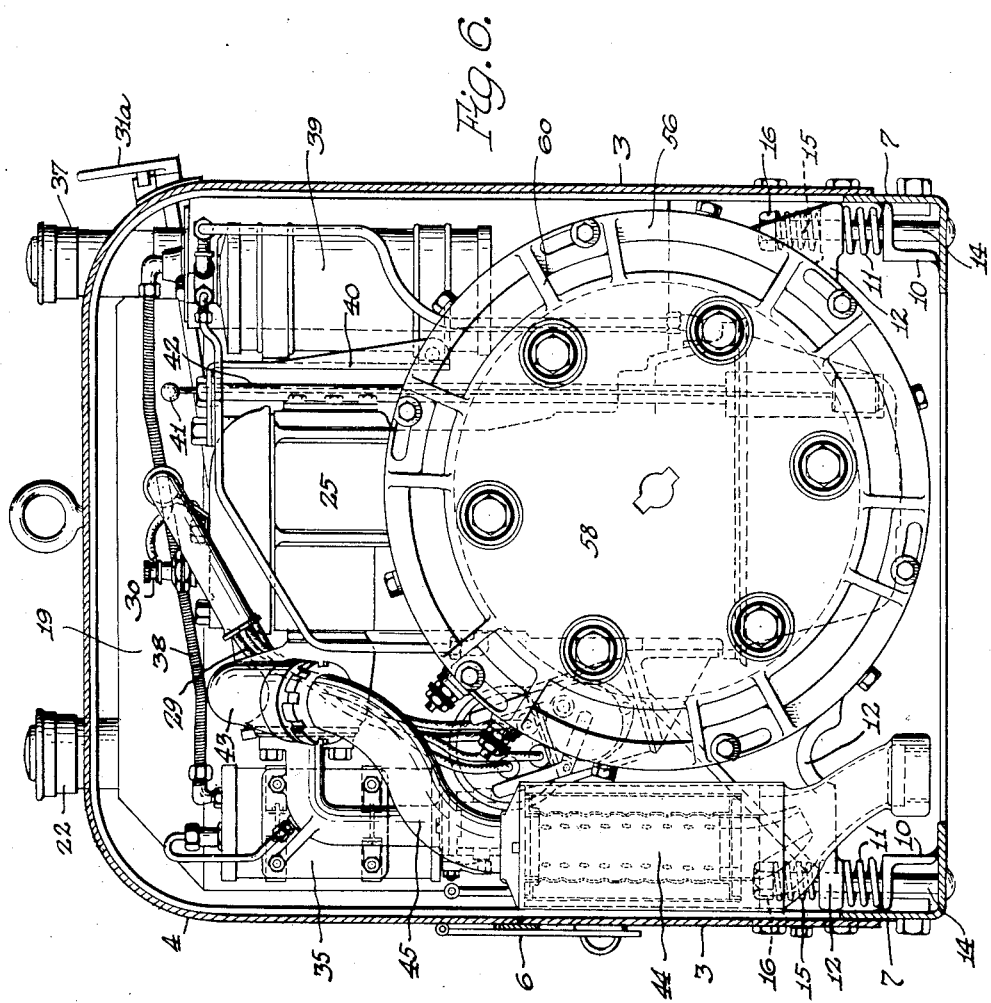
Inventor
Harold D. Gumpper
Attorney Aug. 6, 1929.　　　　H. D. GUMPPER　　　　1,723,851
ELECTRIC POWER GENERATING UNIT
Filed Oct. 22, 1928　　　5 Sheets-Sheet 5

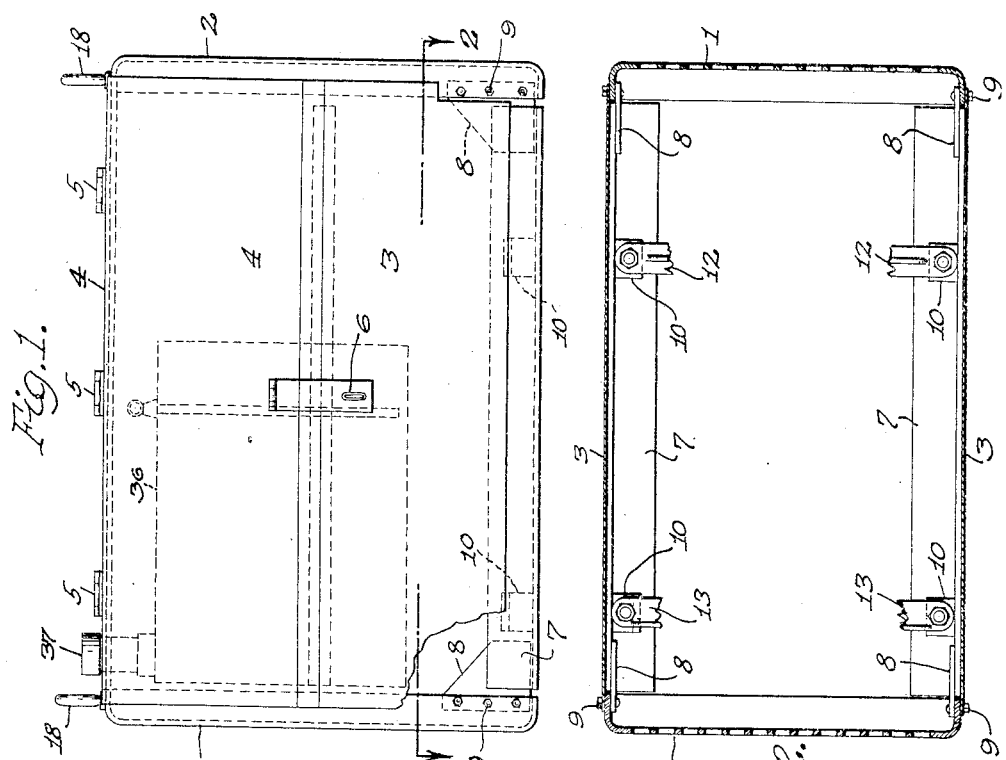

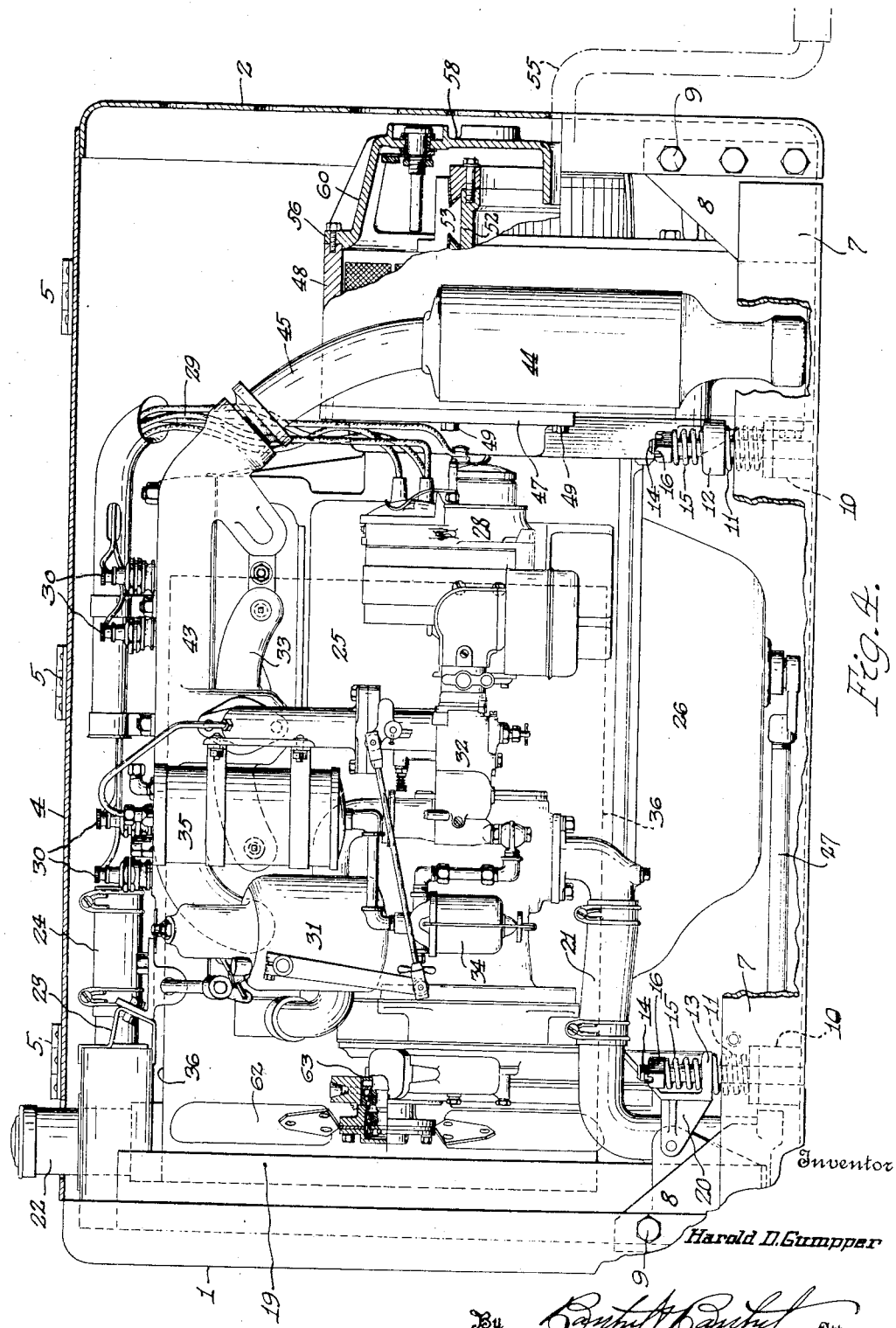

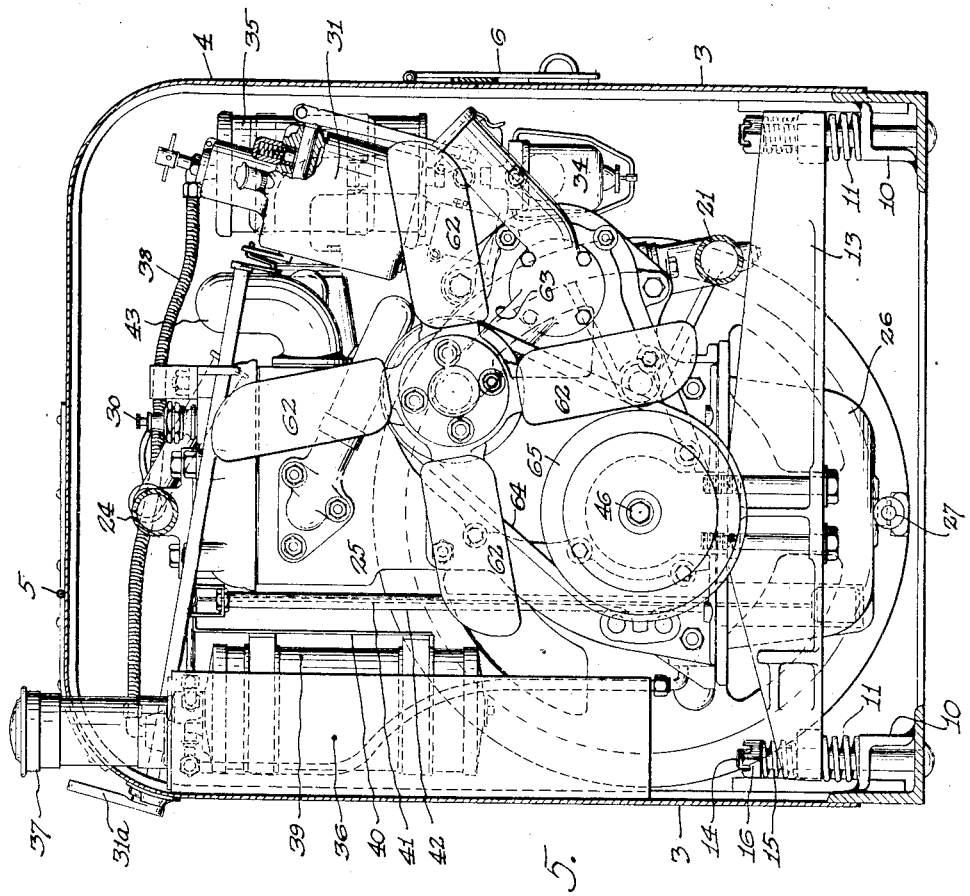

Inventor
Harold D. Gumpper

By
Attorneys

Patented Aug. 6, 1929.

1,723,851

UNITED STATES PATENT OFFICE.

HAROLD D. GUMPPER, OF DETROIT, MICHIGAN.

ELECTRIC-POWER GENERATING UNIT.

Application filed October 22, 1928. Serial No. 314,103.

Power trucks of the kind that are used for transportation purposes in large factories, mills, warehouses, railway shops, railway stations and other places where loads are transported for short distances, are usually propelled by an electric motor supplied with current from a storage battery, and the truck is provided with a platform for supporting these storage batteries with the electric motor mounted beneath this platform, the load carrying platform being located ahead of and in a plane lower than that of the platform on which the batteries are supported.

An object of the present invention is to provide a complete electric generating power plant including a prime mover such as a gas engine and a dynamo driven by the motor for generating electric current, said complete generating plant being of such construction that it may be bodily substituted for the storage batteries upon power trucks of this character. Such a unit is therefore limited in its dimensions by the size of the battery supporting platform of the truck and must also be limited in its height so that the operator may readily see over it to control the direction of travel and manipulate the load in the usual manner of operating such power truck.

In order to provide the necessary elements of such an electric power generating unit within the limited space, necessitates a re-arrangement of these elements from the ordinary arrangement commonly employed where space is not such a vital factor. An object of the present invention is to provide such combination and relative arrangement of devices that a complete electric-power generating plant may be provided within the limited space afforded by the battery platform of a power truck of the character described.

A further object is to provide a construction and arrangement whereby the several devices are readily accessible for attention or repair and the whole assembly forms a unit power plant completely operative within the limited space provided upon this type of trucks. It is also an object to provide a construction and arrangement whereby an efficient cooling of the devices, including the electric generator, is secured. A further object is to provide an electric power generating unit including an internal combustion engine, in which the several necessary devices are so relatively arranged that the unit may include a complete engine cooling system within the limited space afforded. It is also an object to provide an arrangement whereby the gas engine is yieldingly supported upon a supporting frame and whereby the entire structure as a unit may be lifted from the truck and the lower part of the engine thereby made accessible through the open frame for the purpose of attention or repair. It is also an object to secure a compactness of the assembled devices by making the housing for the generator a detachable part of the gas engine block with the core of the generator forming the engine fly wheel. It is also an object to secure compactness by arranging the several devices making up a complete electric-power generating unit, with a radiator at one end of the unit and an electric generator at the opposite end of the unit, said arrangement being such that a crank may be applied through the generator at that end of the unit for starting the gas engine, and a further object is to provide an electric generating plant including all of the devices necessary or expedient in the efficient operation of a gas engine, including both air and water cooling systems, complete ignition and control systems, a fuel feeding system and fuel supply, a governor for the engine, an exhaust muffler, and an electric generator driven directly by the engine, all arranged to be enclosed within a suitable casing and mounted upon a frame to be moved about as a unit.

With the above and other objects in view the invention consists in the construction of the unit and the arrangement therein of the devices necessary to make up a complete electric-power generating unit, and the invention further consists in the several matters hereinafter more fully described and particularly pointed out in the appended claims, reference being had to the accompanying drawings, in which Figure 1 is a side elevation of the casing and frame of the unit with portions broken away to more clearly show the construction;

Figure 2 is a horizontal section upon the line 2—2 of Figure 1;

Figure 3 is an end elevation of Figure 1;

Figure 4 is an enlarged central longitudinal section through the casing and showing in elevation, the several devices making up the power generating plant, in side elevation therein, portions being broken away and in section to more clearly disclose the construction;

Figure 5 is a front end elevation of Figure 1 with the front end of the casing and radiator removed to show the front end of the gas engine in elevation and the relative position of the other devices contained within the casing;

Figure 6 is a view similar to Figure 5 with the rear end of the casing removed and the casing in section to show the rear end of the gas engine and the position relative thereto of the generator and other devices.

Figure 7:
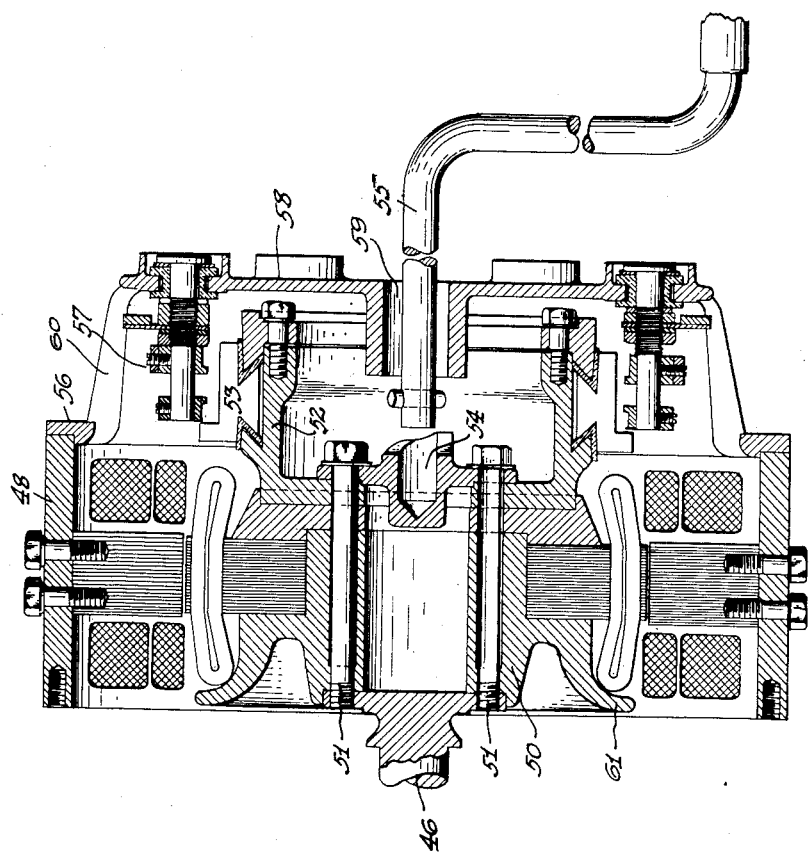
Figure 7 is a central longitudinal section through the electric generator detached.

As shown in Figures 1 to 3 inclusive the casing of the unit comprises heads or ends 1 and 2 and a sheet metal wall 3 enclosing the top and sides, said wall including a door 4 which is hinged at 5 so that the top of the casing may be open to gain access to the interior thereof, the door being held in locked position by means of a suitable fastening or hasp 6. The ends 1 and 2 are perforated and are secured to a bottom supporting frame comprising angle members 7 extending longitudinally of the casing and having corner plates 8 to which the ends 1 and 2 are secured in any suitable manner as by bolts 9. Welded or otherwise secured within the angles of the angle members 7 are short lengths of angle bars 10 which are welded or otherwise firmly secured in the angles of the angle bars with one flange resting upon the bottom flange of the angle bar and the other flange extending in a horizontal position with its edge welded to the upstanding flange of the angle bar 7. These short angle bars or blocks 10 form seats for springs 11 which are interposed between the seats and brackets 12 and the ends of a cross bar 13 forming the front support for a gas engine block. Rods or bolts 14 pass through openings in the ends of the supporting bar 13 and through openings in the ends of the brackets 12 which form laterally extending supports for the rear end of the gas engine block. The springs 11 are sleeved upon these rods 14 and similar springs 15 are sleeved upon the rods between the upper sides of the supporting ends of the bar and brackets, and nuts 16 on the upper ends of the rods. The entire weight of the gas engine is therefore yieldingly supported upon the supporting frame which forms the lower side or bottom of the casing. Eyes or loops 18 are provided on the ends 1 and 2 of the casing at the upper side thereof so that by engaging suitable lifting mechanism with these eyes, the entire unit may be lifted.

Mounted within the casing adjacent the end 1, is a radiator structure 19, said structure being attached to and supported upon the cross member 13 by means of ears or brackets 20 on said member extending forwardly therefrom, and a water connection or pipe 21 connects the lower end of the radiator with the water jacket of the gas engine in the usual manner. The upper end or tank portion of the radiator has a fill pipe 22 extending through the top of the casing and a suitable bracket 23 on the tank is bolted to a part of the gas engine block so that the upper end of the radiator is attached to and supported by the engine. A water connection 24 connects the upper end or tank of the radiator with the jacket of the gas engine in the usual manner.

25 indicates the body or block of the gas engine which block is yieldingly supported at its ends by means of the springs 11 previously described. The pan 26 forms the lower part of and closes the lower end of the engine block in the usual manner and as shown in Figs. 4 and 5 a pipe 27 is provided for drawing off the oil from the bottom of this pan. Supported upon a suitable bracket projecting from one side of the engine block near its rear end, is the usual magneto 28 having the usual wires 29 leading to the several spark plugs 30 and adjacent the forward end of the engine block is a common form of speed governor 31 also mounted on the side of the engine block with a hand control lever 31ª on the casing which lever is operatively connected with the speed governor to maintain the engine at idling speed. The usual carbureter 32 is mounted at the same side of the block, being supported by the uptake pipe leading therefrom to the intake manifold 33 in the usual manner.

A gasoline filter or clarifier 34 is provided for supplying gasoline to the carbureter and a vacuum tank 35 is supported from the engine block adjacent and above the carbureter. At the opposite side of the engine is a gasoline supply tank 36 supported by the closed side of the casing and this tank has a fill pipe 37 extending through the top of the casing and a flexible hose 38 connects the supply tank with the top of the vacuum feed tank 35. At the same side of the engine on which the tank 36 is located, a lubricant supply tank 39 is supported by means of a bracket 40 on the engine block and this lubricant tank has the necessary pipe connections with the several parts of the engine to be oiled. An oil level indicating gauge 41 is positioned alongside the engine block and comprises a float operated rod extending through a tube 42 leading into the crank case of the engine to indicate the level of oil in said crank case.

Attached to the side of the engine block directly above the intake manifold 33 is an exhaust manifold 43 arranged in the usual manner and to the outlet end of this manifold is connected an exhaust muffler 44 by a short exhaust pipe 45, the muffler being supported by the pipe adjacent one side of the casing between said side and the casing of an electric generator at the rear end of the engine block, with the exhaust end of the muffler just above the horizontal plane of the bottom of the casing and in a position to exhaust downwardly through the open supporting frame forming the lower side of the casing.

The rear end of the engine block is formed with an integral end projection concentric with the crank shaft 46 (see Fig. 7) of the engine and this projecting portion of the block is provided with a circular flange 47 for the attachment thereto of the electric generator casing 48 which carries the field of the generator and is firmly secured to said flange by bolts 49 (see Fig. 4). The generator casing is therefore supported by the engine block concentric with the rear end of the crank shaft and secured directly to this projecting end of the crank shaft is the armature 50 (Fig. 7) of the generator by forming the rear end of the crank shaft with a circular flange provided with screw-threaded openings to receive bolts 51 passing through openings in the armature and screwed into the openings in this flange. The armature 50 is formed with an axial bore and a tubular extension 52 of the armature carries on its periphery the usual terminal blocks 53, the tubular member being firmly secured in place against the armature 50 by the bolts 51 which bolts also secure in place a socket member 54 to receive the end of a starting crank 55 so that by engaging the crank with this socket member, the engine crank shaft may be rotated by rotating the armature 50.

The generator casing 48 is provided with the usual extension 56 to enclose and carry the brushes 57 which are mounted in the usual manner upon an end plate 58 of the extension 56. This end plate has an axial opening 59 through which the starting crank 55 may be inserted and which opening forms a bearing support for the crank. The extension 56 is also provided with a series of peripheral openings 60 so that air may freely enter the generator casing and circulate therethrough to cool the armature and parts.

As clearly shown in Figure 7 of the drawings the armature body 50 is formed with a bell shaped or outwardly flaring flange 61 on its inner end which flange forms a deflector for the air passing through the generator between the armature and fields and this flange also serves to deflect any oil which may find its way past the rear bearing for the crank shaft so that this oil will not get on to the windings of the generator.

Air is drawn through the perforated end wall 2 of the casing and through the casing from end to end thereof, and forced out through the radiator and through the perforated end wall 1 of the casing. This circulation of air is caused by the usual fan 62 which is mounted upon a suitable bracket 63 secured to the front end of the engine block and this fan is driven by means of a belt 64 passing around a pulley on the fan hub and around a pulley 65 secured to the front end of the crank shaft 46. Said front end of the crank shaft does not project beyond the pulley 65 as is the usual construction where the starting crank is applied to the front end of the engine. The blades of the fan may therefore cut through the longitudinal axis of the crank shaft and lie close to the inner side of the radiator so that space is conserved and to further conserve space, the bracket 63 is offset laterally from the vertical plane of the longitudinal axis of the crank shaft. The position of the fan relative to the axis of the crank shaft is therefore lowered, permitting of the use of a fan of larger diameter and also permitting the upper or water tank of the radiator to project rearwardly over the fan. The space below the radiator tank is therefore utilized and this is permitted by the lowering and offsetting of the cooling fan.

A portable power plant is thus provided for generating electric current, and which plant is complete in every detail so that it may operate continuously while being moved about and the several devices and parts of which are so arranged as to take up a minimum of space making it particularly adaptable for use upon commercial platform trucks, all of the several devices and parts being mounted upon the engine block, which in turn is mounted upon a suitable supporting frame carrying a casing for enclosing the entire assembly, with springs interposed between said engine block and frame to absorb vibrations and protect the parts.

Obviously changes may be made in the details of construction within the scope of the appended claims without departing from the spirit of the invention and I do no therefore limit myself to the particular construction and arrangement shown.

Having thus fully described my invention what I claim is:—

1. An electric power generating unit including an internal combustion engine having a cylinder block and shaft, a generator armature mounted upon one end of the crank shaft, a field for said armature, a casing forming a support for the field of the generator and secured to and supported solely by the engine block, a cooling system for the engine including a fan and a radiator mounted at the end of the engine opposite that at which the generator is supported, said supporting casing for the generator armature being provided with openings to admit air to be drawn therethrough by said fan for cooling the generator, a frame upon which the engine is mounted, and a casing for the unit carried by said frame and having a perforated end wall adjacent said radiator and a perforated end wall adjacent the generator.

2. An electric power generating unit as characterized in claim 1 and further characterized in that said supporting casing for the generator armature is provided with an end wall having an opening for the insertion therethrough of a starting crank and means is provided within said casing and secured to the armature axially thereof for engagement therewith of said starting crank, said adjacent end wall of the casing for the unit being provided with an opening through which the starting crank may be inserted for cranking the engine from outside the unit casing at the generator end of the unit.

3. An electric power generating unit including a supporting frame, a casing for enclosing the entire unit having perforated end walls secured to said frame and top end side walls carried by said walls, an internal combustion engine mounted upon said frame with its crank shaft extending centrally and longitudinally of said frame, the crank case portion of said engine being accessible through said frame, an electric generator supported by and secured to one end of the engine, a radiator supported by said engine at the opposite end thereof, water connections for connecting said radiator and engine, a fan supported upon the engine between the same and said radiator, a fuel supply system for the engine including a supply tank within the casing, a vacuum feed tank and carbureter supported upon the engine and connections between said tanks and curbereter, a muffler within the casing supported upon the engine, and speed control means mounted on the engine and having a control lever mounted on the casing.

4. An electric generator unit comprising an inclosing casing, an internal combustion engine mounted in said casing and including an engine block and a crank shaft in said block, a fan pulley on the extreme forward end of said shaft, a fan mounted on a bracket on the forward end of the engine block and driven by said pulley, said fan being so positioned that its blades cut through the axis of the crank shaft beyond the end of the shaft, a radiator in the casing between an end of the casing and said fan and having a tank at its upper end extending toward the engine and overhanging the fan, a generator mounted directly upon the engine with its armature secured directly to the rear end of the crank shaft, and means on the generator armature to be engaged by a starting crank for turning the armature and crank shaft by inserting the starting crank into said generator through the rear end thereof and through an opening in the end of the inclosing casing.

5. A portable electric generating unit comprising a supporting frame formed of angle irons, a casing having perforated ends secured to the ends of said frame and top and side walls secured to said ends, an internal combustion engine with its crank shaft extending centrally and longitudinally of said frame, members on the engine extending laterally therefrom, yielding means interposed between the ends of said members and said frame to yieldingly support the engine on the frame, a radiator at one end of the casing supported at its upper and lower ends from the engine and having a tank at its upper end projecting toward the engine, a fan supported between the engine and radiator and beneath said tank, means on the extreme forward end of the crank shaft for transmitting motion to said fan, an electric generator comprising an armature secured to the rear end of the crank shaft and a casing forming a support for the fields of the generator, said engine being formed with an end plate to which said casing is bolted at one end concentric with the crank shaft and armature, said supporting casing being formed with openings to admit air thereto for cooling the generator and also formed with an end plate having an axial opening, a member within the supporting casing and secured to the armature to be engaged by a starting crank inserted through said opening in said end plate and through an opening in the end of the inclosing casing of the unit, a fuel supply for the engine including a supply tank in the inclosing casing and fuel feeding means supported on the engine, and an oil pan beneath the engine and removably secured thereto, said fan being removable through said supporting frame at the bottom of said inclosing casing.

6. An electric-power generating unit comprising a casing, an engine set in said casing with its crank shaft extending longitudinally of the casing, a water cooling system for said engine including a radiator at one end of said casing, an air cooling system for said engine including a fan mounted between one end of the engine and said radiator and driven by the engine, and an electric generator at the opposite end of the engine driven by the crank shaft of the engine and including a generator casing provided with openings to admit air for cooling the armature of said generator, said fan being operative to draw air through one end of the casing, thence through the openings in the generator casing and along the engine, and then forcing the air out through the radiator.

In testimony whereof I affix my signature.

HAROLD. D. GUMPPER.